(12) United States Patent
Ding et al.

(10) Patent No.: US 12,234,797 B2
(45) Date of Patent: Feb. 25, 2025

(54) SMART CONTROLLING SYSTEMS FOR ENERGY STORAGE

(71) Applicant: POWER8 TECH INC., Los Gatos, CA (US)

(72) Inventors: Lien Chun Ding, Taoyuan (TW); Chih Cheng Tai, Campbell, CA (US)

(73) Assignee: Powers8 TECH INC., Los Gatos, CA (US)

( * ) Notice: Subject to any disclaimer, the term of this patent is extended or adjusted under 35 U.S.C. 154(b) by 0 days.

(21) Appl. No.: 18/199,745

(22) Filed: May 19, 2023

(65) Prior Publication Data
US 2023/0299697 A1    Sep. 21, 2023

Related U.S. Application Data

(63) Continuation-in-part of application No. 17/777,516, filed as application No. PCT/US2022/029374 on May 16, 2022, now Pat. No. 11,870,253.
(Continued)

(30) Foreign Application Priority Data

Dec. 3, 2021  (CN) .......................... 202111466565.5

(51) Int. Cl.
*F03B 13/06* (2006.01)
*G05B 19/042* (2006.01)
(Continued)

(52) U.S. Cl.
CPC ............ *F03B 13/06* (2013.01); *G05B 19/042* (2013.01); *H02J 3/008* (2013.01); *H02J 9/06* (2013.01); *G05B 2219/2639* (2013.01)

(58) Field of Classification Search
CPC ........ Y02E 10/20; Y02E 70/30; H02J 15/003; H02J 15/006; H02J 2300/20
See application file for complete search history.

(56) References Cited

U.S. PATENT DOCUMENTS 2,652,690 A  *  9/1953  Labriola ................. F03B 13/06
                                                       60/398
3,991,574 A     11/1976  Frazier
(Continued)

FOREIGN PATENT DOCUMENTS

CN          102966387 A        3/2013
CN          103925111 A        7/2014
(Continued)

OTHER PUBLICATIONS

International Search Report in International Application No. PCT/US23/23063, mailed on Sep. 29, 2023, 17 pages.
(Continued)

*Primary Examiner* — Thomas E Lazo
(74) *Attorney, Agent, or Firm* — Haverstock & Owens, A Law Corporation

(57) ABSTRACT

A computer-controlled energy storage system optimizes the process of energy storage and electricity re-generation. In an energy storage and release cycle, the gas is compressed and released in a pressure range that is optimized in terms of energy storage and release (e.g., round trip) efficiency. In some embodiments, the gas is not pressurized to an unneeded high-pressure level (e.g., 100 atm) and also does not release to an exhaust pressure level (e.g., 0 atm).

25 Claims, 8 Drawing Sheets

Compression Efficiency
$P_X = nRT_1/V$
$P_0$ = Initial
$P_{TC}$ = Target pressure of the compressed pressure (e.g., 60atm)
$P_{TR}$ = Target pressure of the released pressure (e.g., 60atm)
$P_{SC}$ = sensed current pressure
$P_{ATC}$ = Adjusted Target pressure of the compressed pressure
$P_{ATR}$ = Adjusted Target pressure of the released pressure Liquid Pumping Efficiency
Fluid type
Fluid density
Fluid temperature Generator Efficiency
turbine speed
turbine friction

Related U.S. Application Data

(60) Provisional application No. 63/345,274, filed on May 24, 2022.

(51) Int. Cl.
*H02J 3/00* (2006.01)
*H02J 9/06* (2006.01)

(56) References Cited

U.S. PATENT DOCUMENTS

| | | | |
|---|---|---|---|
| 4,206,608 A * | 6/1980 | Bell | F03D 9/17 290/55 |
| 4,220,006 A | 9/1980 | Kindt | |
| 4,367,786 A | 1/1983 | Hafner et al. | |
| 4,525,631 A | 6/1985 | Allison | |
| 6,109,358 A | 8/2000 | McPhee | |
| 6,718,761 B2 * | 4/2004 | Merswolke | F03D 9/008 60/398 |
| 7,168,252 B1 | 1/2007 | Price | |
| 7,281,371 B1 * | 10/2007 | Heidenreich | F03B 13/06 60/398 |
| 7,364,810 B2 | 4/2008 | Sridhar et al. | |
| 7,579,700 B1 * | 8/2009 | Meller | F03B 17/005 290/43 |
| 7,663,255 B2 * | 2/2010 | Kim | F02C 6/18 290/1 R |
| 7,743,609 B1 | 6/2010 | Brostmeyer | |
| 7,878,280 B2 | 2/2011 | Sridhar et al. | |
| 8,037,678 B2 | 10/2011 | McBride et al. | |
| 8,127,542 B1 * | 3/2012 | Dolcimascolo | F03B 17/005 60/398 |
| 8,240,956 B2 | 8/2012 | Lewis | |
| 8,723,347 B2 | 5/2014 | Crane et al. | |
| 8,739,533 B2 | 6/2014 | Yogev et al. | |
| 8,806,866 B2 | 8/2014 | McBride et al. | |
| 8,823,195 B2 * | 9/2014 | Legacy | F03B 13/08 290/43 |
| 9,059,605 B2 | 6/2015 | Murray et al. | |
| 9,261,068 B2 * | 2/2016 | Barakat | F03B 13/00 |
| 9,410,559 B2 | 8/2016 | VanWalleghem et al. | |
| 9,422,948 B2 * | 8/2016 | Kim | F15B 15/00 |
| 9,444,378 B2 * | 9/2016 | Fong | F17C 13/04 |
| 9,562,521 B2 | 2/2017 | Yogev | |
| 9,797,366 B2 | 10/2017 | Schmidt-Boecking et al. | |
| 10,203,735 B2 | 2/2019 | Gross et al. | |
| 10,205,323 B2 * | 2/2019 | Lowell | H02J 3/381 |
| 10,208,737 B1 | 2/2019 | Freeman | |
| 10,344,741 B2 * | 7/2019 | Sant | F03D 13/25 |
| 10,415,469 B2 * | 9/2019 | Blount | F02C 6/06 |
| 10,655,505 B2 | 5/2020 | Matsukuma et al. | |
| 10,707,802 B1 * | 7/2020 | Materna | H02S 20/32 |
| 10,823,132 B2 | 11/2020 | Mesinger et al. | |
| 10,836,579 B2 | 11/2020 | Yogev | |
| 10,837,429 B2 | 11/2020 | Pedretti et al. | |
| 10,859,207 B2 | 12/2020 | Lewis et al. | |
| 11,274,792 B2 | 3/2022 | Stradiotto et al. | |
| 11,387,707 B2 | 7/2022 | Yogev | |
| 11,404,935 B2 | 8/2022 | Yogev | |
| 2002/0144503 A1 | 10/2002 | Merswolke et al. | |
| 2005/0155347 A1 | 7/2005 | Lewellin | |
| 2005/0198959 A1 | 9/2005 | Schubert | |
| 2005/0279085 A1 * | 12/2005 | Moore | F03B 13/185 60/398 |
| 2007/0289622 A1 | 12/2007 | Hecht | |
| 2008/0136186 A1 | 6/2008 | Gogoana et al. | |
| 2008/0211230 A1 | 9/2008 | Gurin | |
| 2009/0152871 A1 * | 6/2009 | Ching | F03G 7/00 415/916 |
| 2010/0089063 A1 | 4/2010 | McBride | |
| 2010/0096858 A1 | 4/2010 | Riley | |
| 2010/0192568 A1 | 8/2010 | Peacock | |
| 2010/0205960 A1 | 8/2010 | McBride | |
| 2010/0252028 A1 | 10/2010 | Mierisch et al. | |
| 2010/0270801 A1 | 10/2010 | Liu | |
| 2010/0326062 A1 | 12/2010 | Fong et al. | |
| 2011/0030361 A1 * | 2/2011 | Gopalswamy | F16D 31/02 60/398 |
| 2011/0041490 A1 * | 2/2011 | Gogoana | F15B 1/024 60/484 |
| 2011/0120673 A1 | 5/2011 | Xiang et al. | |
| 2011/0259007 A1 | 10/2011 | Aoyama et al. | |
| 2011/0266804 A1 * | 11/2011 | Dolcimascolo | F03B 17/04 415/916 |
| 2011/0268804 A1 | 11/2011 | Dolcimascolo | |
| 2011/0296822 A1 | 12/2011 | Bollinger et al. | |
| 2012/0305411 A1 | 12/2012 | Elazari-Volcani | |
| 2013/0134612 A1 | 5/2013 | Lewis et al. | |
| 2013/0214537 A1 | 8/2013 | Hashimoto | |
| 2013/0219892 A1 | 8/2013 | Havel | |
| 2013/0220310 A1 | 8/2013 | Gregory et al. | |
| 2014/0026547 A1 | 1/2014 | Kim et al. | |
| 2015/0000248 A1 | 1/2015 | del Omo | |
| 2015/0211551 A1 | 7/2015 | VanWelleghem et al. | |
| 2016/0178129 A1 | 6/2016 | Chen et al. | |
| 2016/0201658 A1 | 7/2016 | Arapkoules | |
| 2016/0348637 A1 | 12/2016 | Bächli | |
| 2017/0264164 A1 | 9/2017 | Lenk et al. | |
| 2018/0306066 A1 | 10/2018 | Yesil | |
| 2018/0320679 A1 | 11/2018 | Enis et al. | |
| 2019/0003384 A1 | 1/2019 | Bannari | |
| 2019/0052094 A1 | 2/2019 | Pmsvvsv et al. | |
| 2019/0064757 A1 * | 2/2019 | Ramamurthy | G05B 13/048 |
| 2019/0221697 A1 | 7/2019 | Cho | |
| 2020/0263830 A1 | 8/2020 | Stradiotto et al. | |
| 2021/0071632 A1 | 3/2021 | Gudesen | |
| 2021/0075296 A1 | 3/2021 | Yogev | |
| 2021/0206574 A1 | 7/2021 | Yogev | |
| 2021/0221652 A1 | 7/2021 | Pedretti et al. | |
| 2021/0351615 A1 | 11/2021 | Yogev | |
| 2021/0388810 A1 | 12/2021 | Young et al. | |
| 2021/0404446 A1 | 12/2021 | Pedretti et al. | |
| 2022/0090585 A1 | 3/2022 | Lewis et al. | |
| 2022/0243701 A1 | 8/2022 | Pedretti et al. | |

FOREIGN PATENT DOCUMENTS

| | | |
|---|---|---|
| CN | 103216426 B | 2/2016 |
| CN | 106091403 A | 11/2016 |
| CN | 105043147 B | 1/2017 |
| CN | 102797613 B | 3/2017 |
| CN | 107002641 A | 8/2017 |
| CN | 104675680 B | 12/2017 |
| CN | 106677848 B | 3/2018 |
| CN | 106499612 B | 6/2018 |
| CN | 109826741 A | 5/2019 |
| CN | 108571415 B | 12/2019 |
| CN | 111636991 A | 9/2020 |
| CN | 112360584 A | 2/2021 |
| CN | 112459980 A | 3/2021 |
| CN | 114198242 A | 3/2022 |
| CN | 114934869 B | 8/2022 |
| JP | 0617555 A | 1/1994 |
| JP | 2015145674 A | 8/2015 |
| TW | M375775 U | 3/2010 |
| TW | 201241308 A | 10/2012 |
| TW | M440345 U | 11/2012 |
| TW | M446825 U | 2/2013 |
| TW | 202108950 A | 3/2021 |
| WO | 2011024928 A1 | 3/2011 |
| WO | 2011076926 A2 | 6/2011 |
| WO | 2015159278 A1 | 10/2015 |
| WO | WO2021078568 A1 | 4/2021 |

OTHER PUBLICATIONS

International Search Report mailed Apr. 1, 2024 in International Application No. PCT/US 23/81234, 15 pages.
International Preliminary Report dated Jun. 13, 2024 in International Application No. PCT/US2022/029374.
Notification Concerning Transmittal of International Preliminary Report on Patentability dated Dec. 5, 2024 issued in PCT Patent Application No. PCT/US2023/023060.

(56) References Cited

OTHER PUBLICATIONS

Notification Concerning Transmittal of International Preliminary Report on Patentability dated Dec. 5, 2024 issued in PCT Patent Application No. PCT/US2023/023063.
Notification Concerning Transmittal of International Preliminary Report on Patentability dated Dec. 19, 2024 issued in PCT Patent Application No. PCT/US2023/024400.
TIPO Search Report in Taiwan Application No. 112118947.
TIPO Search Report in Taiwan Application No. 112120898.
TIPO Search Report in Taiwan Application No. 112118938.
TIPO Search Report in Taiwan Application No. 112128677.

* cited by examiner

Compression Efficiency $P_X = nRT_1/V$
$P_0$ = Initial
$P_{TC}$ = Target pressure of the compressed pressure (e.g., 60atm)
$P_{TR}$ = Target pressure of the released pressure (e.g., 60atm)
$P_{SC}$ = sensed current pressure
$P_{ATC}$ = Adjusted Target pressure of the compressed pressure
$P_{ATR}$ = Adjusted Target pressure of the released pressure

Liquid Pumping Efficiency

Fluid type
Fluid density
Fluid temperature

Generator Efficiency turbine speed
turbine friction

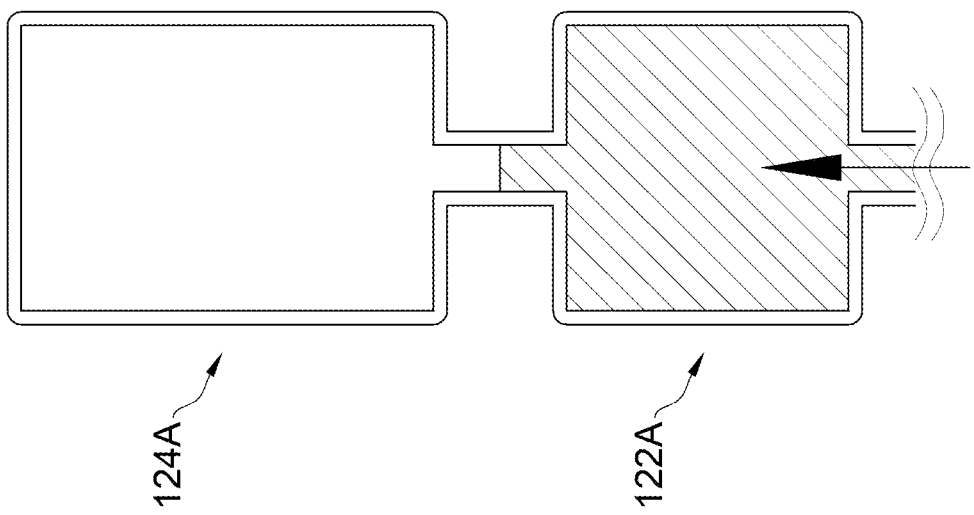

FIG.2

SMART CONTROLLING SYSTEMS FOR ENERGY STORAGE

CROSS-REFERENCE TO RELATED APPLICATIONS

This application is a continuation-in-part (CIP) of the copending U.S. patent application Serial No. U.S. Ser. No. 17/777,516, filed on May 17, 2022, and entitled "ENERGY STORAGE SYSTEMS AND METHODS USING HETEROGENEOUS PRESSURE MEDIA AND INTERACTIVE," which is a National Stage of PCT/US2022/029374, filed on May 16, 2022, and entitled "ENERGY STORAGE SYSTEMS AND METHODS USING HETEROGENEOUS PRESSURE MEDIA AND INTERACTIVE ACTUATION MODULE," which claims a priority to CN202111466565.5, filed on Dec. 3, 2021, and entitled "ENERGY STORAGE SYSTEMS AND METHODS USING HETEROGENEOUS PRESSURE MEDIA AND INTERACTIVE ACTUATION MODULE".

Further, this application claims priority to the U.S. Provisional Application No. 63/345,274, filed on May 24, 2022, and entitled "SMART CONTROLLING SYSTEMS FOR ENERGY STORAGE."

All of the above are incorporated herein by reference for all purposes.

FIELD OF THE INVENTION

The present invention relates to green (renewable) energy power generation and storage. Specifically, the present invention relates to a smart controlling system for energy storage.

BACKGROUND OF THE INVENTION

Typical energy storage systems are either not safe, not efficient, or impractical.

SUMMARY OF THE INVENTION

A computer-controlled energy storage system optimizes the process of energy storage and electricity re-generation. The computer-controlled energy storage system includes a computer instruction implemented (e.g., software) computing device, which can optimize the amount and/or pressure of the water pumped, the compressed air pressure range, the amount and/or pressure of the compressed air released, among other factors. The computer-controlled energy storage system can also use AI (artificial intelligence), ML (machine learning), BD (big data), robots (e.g., computer-controlled valves), VR (virtual reality), and AR (augmented reality) in optimizing the controlling systems.

In an energy storing state, the energy storage system is configured to pressurize/compress the gas (e.g., ambient air and nitrogen gas) to a first predetermined pressure level (e.g., 60 atm or 60 bar) forming a compressed gas for storing the energy. In an energy releasing state, the pressure of the compressed gas is reduced/released to a second predetermined pressure level (e.g., 40 atm or 20 atm) for energy release. In an energy storage and release cycle, the air is compressed and released in a pressure range that is optimized in terms of energy storage (energy storage and release) efficiency. In other words, the gas is not pressurized to an unneeded high-pressure level (e.g., 100 atm) and also does not release to an exhausted pressure level (e.g., 0 atm).

In some embodiments, the compressed air used herein is mainly used as a media, a force providing source, to push water to drive a hydroelectric generator. Thus, the mass, the velocity, the moving direction and the driving force generated by the injecting water or liquid are the factors affect the efficiency of driving the hydroelectric generator, whereas the compressed gas provides a spring-like forces to push/move the water or liquid.

In some embodiments, the energy storage system disclosed here does not rely on the heat generated when the air is compressed and does not rely on the compressed gas itself to drive the hydroelectric generator. Any other factors that are controllable by mechanical, chemical, or operational process and are able to be optimized in terms of energy storage/re-generation efficiency are within the scope of the Present disclosure.

The energy storage system uses a smart energy management system to compress the gas to a predetermined level to provide a controlled and optimized force for pushing and driving the water/liquid to drive the hydroelectric generator.

Other features and advantages of the present invention will become apparent after reviewing the detailed description of the embodiments set forth below.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

FIG. 2 illustrates a method of controlling and managing the energy storage efficiency in accordance with some embodiments.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

Figure 1:
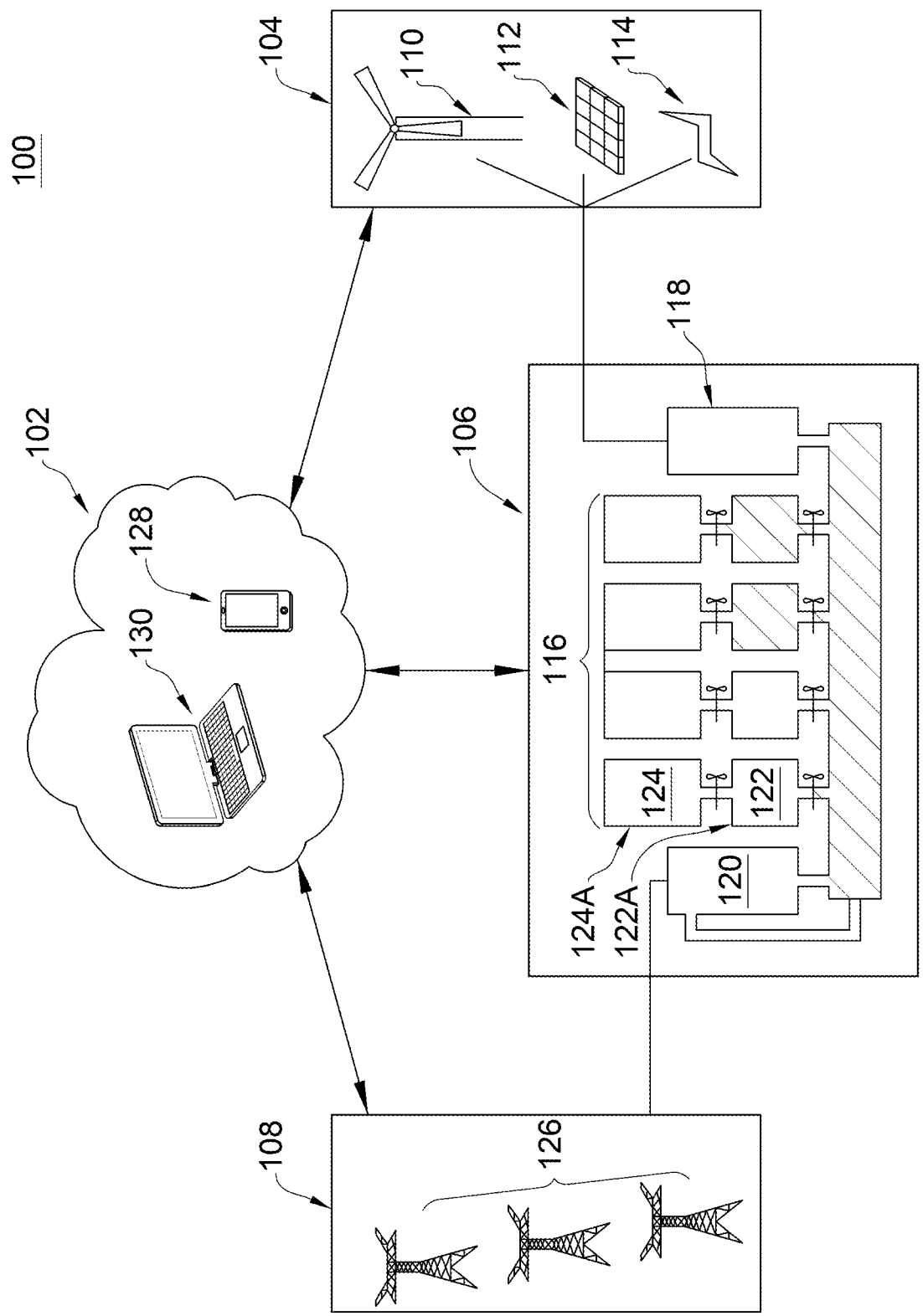
FIG. 1 illustrates a power supplying system in accordance with some embodiments.

FIG. 1 illustrates a power supplying system 100 in accordance with some embodiments. The power supplying system 100 includes a control system 102, an energy generating system 104, an energy storage system 106, and an energy transmitting system 108.

In some embodiments, the control system 102 is configured to communicate/control the energy generating system 104, the energy storage system 106, and the energy transmitting system 108. In some embodiments, the control system 102 includes a computer instruction implemented (e.g., software) computing device, which can also use AI (artificial intelligence), ML (machine learning), BD (big data), robots (e.g., computer-controlled valves), VR (virtual reality), and AR (augmented reality) in assisting the optimization of the controlling operations. In some embodiments, the control system 102 comprises a computer server 130, a phone device 128 (e.g., smart phone), or any other electronic controlling devices that can be signally coupled with the systems and devices to be controlled (e.g., wirelessly or connected with wires).

In some embodiments, the energy generating system 104 has devices that generates electrical energy, including wind turbines 110, solar panels 112, and other forms of energy/electricity generating devices 114 (e.g., nuclear power plant, geothermal electricity generating plant, coal power plant, and renewable energy-based electricity generating plant.)

In some embodiments, the energy storage system 106 comprises one or more pumps 118, one or more vessels 116 (e.g., metal vessels (e.g., 8 mm-10 mm in thickness of steel plate) surrounded/encapsulated by concrete (e.g., 40 cm in its thickness), such as ferro-cement) and one or more generators 120. In some embodiments, the energy storage system 106 comprises one or more pumps 118, one or more concrete containers as the vessels 116 with a predetermined (e.g., 10 cm-100 cm) thickness. A person of ordinary skilled in the art appreciates that any other thickness are variable factors, which can be determined by safety and economic considerations.

The pumps 118 use energy received from the energy generating system 104 to pressurize one or more vessels 116 by pumping fluids (e.g., water 122) to compress the gas 124 forming a pressurized gas. The one or more vessels 116 can be pre-pressurized at a predetermined de-fault pressure, such as 10 atm-60 atm, 20 atm, 30 atm, 40 atm, 50 atm, or 90 atm. One liquid vessel 122A and one gas vessel 124A form a set or a unit of energy storage vessel set. In general, the one or more vessels 116 comprise from one unit to 100,000 units in one location (e.g., a power storage plant). Any numbers of units are within the scope of the present disclosure (e.g., 100,000,000 units). Each of the energy storage vessel set can be controlled and operated independently. In some embodiments, a predetermined numbers or zones of the energy storage vessel set can be controlled and operated together, concurrently, in sequence, or in any operational orders. The operation includes pressurizing, pumping fluids (e.g., liquid and gas), adjusting temperature, controlling rate of moving liquids or gases, and among any other controllable conditions. The one or more hydrogenerators 120 generate (e.g., re-generate) energy by using the water 122 to drive a hydrogenerator, wherein the water 122 is driven or pushed by releasing the pressured gas 124 (e.g., air, nitrogen or a mixture of two or more gases).

In some embodiments, the energy transmitting system 108 (e.g., electric power grid 126) transmits electricity to be used by users (e.g., residential uses and commercial uses).

In some embodiments, the energy storage system 106 is used as the energy storage device of the current power generation source (e.g., the energy generating systems 104). For example, the power generation source can be thermal power generation systems, hydroelectric power generation systems or a wind power generator, nuclear power, geothermal energy, tidal energy, etc. The power generation source generates electrical energy, and the electrical energy can further drive the pump 118 of the heterogeneous pressure media and interactive actuation energy storage system (e.g., the energy storage system 106) allowing the pump 118 to operate the working fluid to store energy in the energy storage 116. According to the power demand of the electrical energy (such as residential electricity, industrial electricity, etc.), the energy storage can be matched with or support the power generation source, or be the main alternative power source, supplying the electrical energy to the electrical energy demand through the electric power network at any time.

FIG. 2 illustrates a method 200 of controlling and managing the energy storage efficiency in accordance with some embodiments.

In some embodiments, the control system 102 (FIG. 1) is configured to communicate/control the energy storage system 106 (FIG. 1), which optimizes the energy storage and re-generating efficiency. For example, the control system 102 (FIG. 1) receives sensed system conditions and environmental conditions (e.g., via one or more sensors coupled with the energy storage system) and use such received information to calculate and control the energy storage system 106 (FIG. 1), so that the energy storage system 106 is operated at an optimized efficiency. The efficiency can include total energy store-and-release efficiency (e.g., energy conversion rate, such as maintaining at least 65% or 70% or above efficiency), generating most economic value (e.g., compress and release the water and gas at a speed or manner that generates most dollar profits, generating the least heat, generating the most heat, causing the least equipment damages, optimized matching efficiency of the rotational speed of the hydrogenerator with driving fluid (e.g., liquid or gas) or any other efficiencies.

In some embodiments, the control system 102 (FIG. 1) is configured to operate the energy storage system 106 (FIG. 1) to repeatedly pressurized and de-pressurized in a predetermined pressure range similar to release 20% of a compressed spring and then compress again to compress back the released 20% of the spring. The energy storage system does not pressurize the air to a very high pressure, which cause significant energy lost among other issues. In contrast, in some embodiments, the compressed air of the Present energy storage system is pressurized to around 60 bar/atm only. The compressed air, in fact, is acting more like a mechanical spring providing a force pushing the water to drive the hydro-generator. So the energy storage system discloses herein can be more like a piston in a combustion engine, where the water is more like the piston and a change of the air pressure is used to push or pull the piston (e.g., causing a repeating back-and-force motion). In other words, there is a delicate balance in terms of the ideal pressure range vs. energy storage efficiency.

In some embodiments, the control system 102 (FIG. 1) is configured to monitor and operate the energy storage system 106 (FIG. 1) based on the following efficiency factors including compression efficiency, liquid pumping efficiency, generator efficiency or a combination therefore (e.g., the total efficiency of the system).

In some embodiments, the total efficiency of the system can be the total energy store-and-release (or regenerate) efficiency, which can be operated using the formula $f_x(P_x) = nRT/V$, wherein P is the pressure, x is the status of the selected time, n is the molar number of gas to be compressed, R is a predetermined constant or an ideal gas constant, and T is the temperature. Artificial intelligence or machine learning are used based on the formula provided above or any other formula to monitor and optimize the efficiency of the energy storage system.

The above formula can be rewritten into $V_{(air, t)} = nRT/P$. Since the total volume ($V_{total}$) of the total space of the vessels minus the volume occupied by the air $V_{(air, t)}$ equal to the volume of the water $V_{(water, t)}$, the amount of energy stored can be shown as $V_{(water, t)} = V_{total} - V_{(air, t)}$. Thus, $V_{(water, t)}$ can be used as a control factor for how much energy is stored or to be stored at the specific time$_{(t)}$.

In an example, the control system 102 sets an initial pressure $P_0$ at time zero, which is the starting point of compression. $P_{TC}$ is a Target Pressure of the Compressed Pressure (e.g., 60 atm), $P_{TR}$ is a Target Pressure of the Released Pressure (e.g., 40 atm), $P_{SC}$ is a Sensed Current Pressure (e.g., 10 atm at 1 hr mark of the compression process). The implemented software calculated and proposed an operational model makes the energy storage perform with an optimized efficiency. During the gas compression process, the targeted pressure of the compressed and release pressure are adjusted based on the sensed conditions, such as the changes of the sensed temperatures, changes of the electricity costs, among other factors. Thus, the control system 102 provides $P_{ATC}$ which is an Adjusted Target Pressure of the Compressed Pressure (e.g., 58.6 atm), $P_{ATR}$ which is an Adjusted Target Pressure of the Released Pressure (e.g., 38.2 atm).

In some embodiments, the control system 102 monitors and control the air compression to generate a small amount of heat, which is sufficient to be used to provide heat to the gas when it is expanded subsequently. The heat can be stored first and then subsequently transferred to be used. The above operation can be based on the equation $P_2V_2/P_1V_1 = T_2/T_1$, wherein 1 indicates a first condition/status (e.g., before gas compression) and 2 indicates a second condition/status (e.g., after gas compression). In some cases, since the gas to be compressed is from 40 atm to 60 atm, (60−40)/40=0.5 times of the original pressure is the pressure change amount. Such heat generated during compression can be insignificant.

In some embodiments, the liquid pumping efficiency to be monitored and optimized includes pump type, pump operational efficiency, and among other factors.

In some embodiments, the generator efficiency to be monitored and optimized includes turbine speed, turbine friction, and liquid speed & amount to energy generating ratio, and among other factors.

In some embodiments, the air compression is controlled by an AI model. The system modified the model based on the prior operational efficiency to adjust the AI model so that the control factors are optimized based on various environmental conditions, such as temperature of the weather, temperature of the water pumped in, temperature of the tank, temperature of the encapsulating concrete, among other factors.

Figure 3:
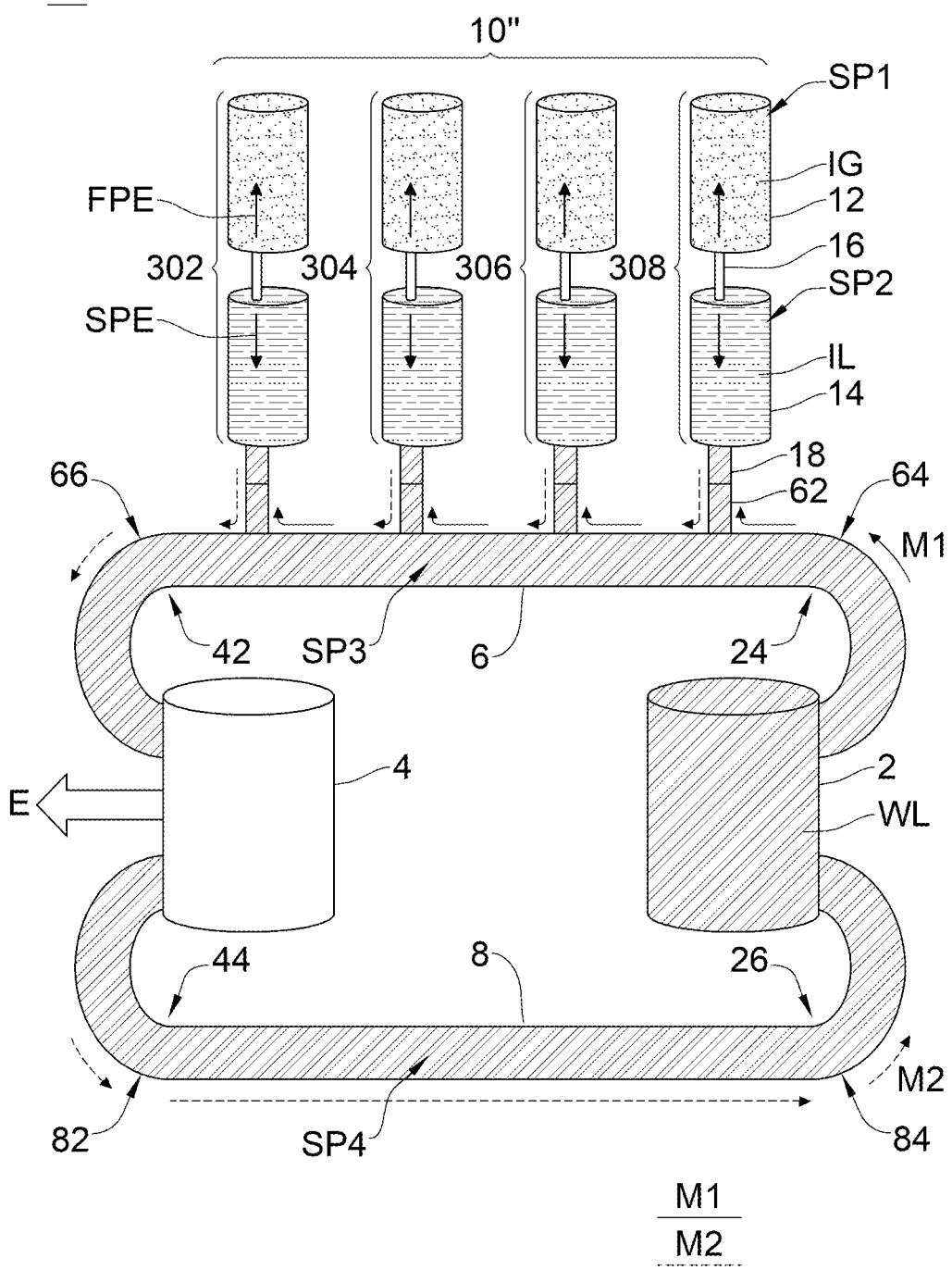
FIG. 3 is a three-dimensional schematic diagram illustrates the energy storage system in accordance with some embodiments.

FIG. 3 is a three-dimensional schematic diagram 300 illustrates the energy storage system 106 (FIG. 1) in accordance with some embodiments. In the FIG. 3, a heterogeneous pressure media and interactive actuation energy storage system 20 includes a plurality of energy storages 10'' (e.g., similar to the energy storage 116 of FIG. 1), a liquid source 2, a converter 4 (e.g., hydrogenator), a first pipe 6 and a second pipe 8. Here, the energy storage 10'', the liquid source 2, the converter 4, the first pipe 6 and the second pipe 8 forming a closed and circulating energy storage and release structure according to the flow path of the working fluid WL.

Here, the energy storages 302, 304, 306 and 308 are illustrated by 4 units as an example. In other embodiments, the number can be arbitrarily selected, for example, the range of the number may be between 10 and 100 energy storages 10'', 100 and 1,000 energy storages 10'', or 1,000 and 999,999 energy storages 10''. Here, the energy storages 302, 304, 306 and 308 respectively accommodate a fluid (e.g., liquid, gas, or a combination thereof) and respectively include a first set of containers 12, a second set of containers 14, a first set of tubes 16 and a second set of tubes 18. In addition, in some embodiments, the energy storages 302, 304, 306 and 308 may be added to or removed from the heterogeneous pressure media and interactive actuation energy storage system 20 in real-time or on-demand. Or, the energy storages 302, 304, 306 and 308 may be controlled through the valve body to determine whether to operate (deemed as added) or not to operate (deemed as removed) in the energy storage system 20.

The first set of containers 12 forms a first set of spaces SP1 to store an initial gas IG (e.g., air or helium) in each of the first set of containers 12.

The second set of containers 14 are disposed of on the lower side of the first set of containers 12, and the second set of containers 14 form a second space SP2 to store an initial liquid IL (e.g., water) in each of the second set of containers 14.

One end of the first tube 16 is coupled to the first container 12 and the other end of the first tube 16 is coupled to the second container 14, so that the first tube 16 connects with the first space SP1 and the second space SP2.

One end of the second tube 18 is coupled to the second container 14 and the other end of the second tube 18 is coupled to the first pipe 6. Wherein, the diameter of the second tube 18 may be larger or smaller than the diameter of the first tube 16.

The liquid source 2 supplies and recycles the working liquid WL. For example, the liquid source 2 may be a reservoir, a water tower, a reservoir, and the like. Wherein, the function of the liquid source 2 functioning as a supply can be referred to as the description of the prior embodiment, which will not be repeated here. Here, in addition to the function of supply, the liquid source 2 can also recycle the working fluid WL outputted by the converter 4 through the second pipe 8.

The converter 4 receives and outputs the working fluid WL (e.g., dual functions of a liquid pump and a hydro generator). For example, the converter 4 may be a liquid pump, a turbo pump, a liquid generator, a liquid turbine generator, a hydro turbine generator, or other liquid driven device configured to generate electricity. When the converter 4 functions as a supply, reference may be made to the description of the prior embodiment, which will not be repeated here. Here, in addition to the function of supplying, the liquid source 2 can also recycle the working liquid WL outputted from the converter 4 through the second pipe 8.

The first pipe 6 forms a third space SP3, and the first pipe 6 has a plurality of connection ports 62, a first connection point 64, and a third connection point 66. Each of the connection ports 62 connects each of the second spaces SP2 and each of the third spaces SP3. In addition, the first connection point 64 and the third connection point 66 are formed at the two ends of the first pipe 6. The first connection point 64 is coupled to the first end 24 of the liquid source 2 and the third connection point 66 is coupled to the first end 42 of the converter 4.

The second pipe 8 forms a fourth space SP4, and a first end 82 of the second pipe 8 is coupled to a second end 44 of the converter 4 and a second end 84 of the second pipe 8 is coupled to the second end 26 of the liquid source 2.

In the first operation mode M1 (e.g., energy storing mode), the working liquid WL from the liquid source 2 is injected into the second space SP2 through the first pipe 6 and the second tube 18, so that the working liquid WL drives the initial liquid IL through the first tube 16 to continuously compresses the initial gas IG in the first space SP1 until the initial gas IG acting on the first space SP1 has a predetermined pressure, thereby enabling the first container 12 to store a first pressure energy FPE.

In the second operation mode M2 (e.g., energy releasing mode), the initial gas IG continuously expands due to its pressure by opening a controlling valve to drive the initial liquid IL moving toward and discharge from the second tube 18 to convert the first pressure energy FPE into a second pressure energy SPE and pass through the first pipe 6 to drive the converter 4 to generate an electrical energy E; and the working liquid WL after driving the converter 4 returns to the liquid source 2 through the second pipe 8.

Figure 4:
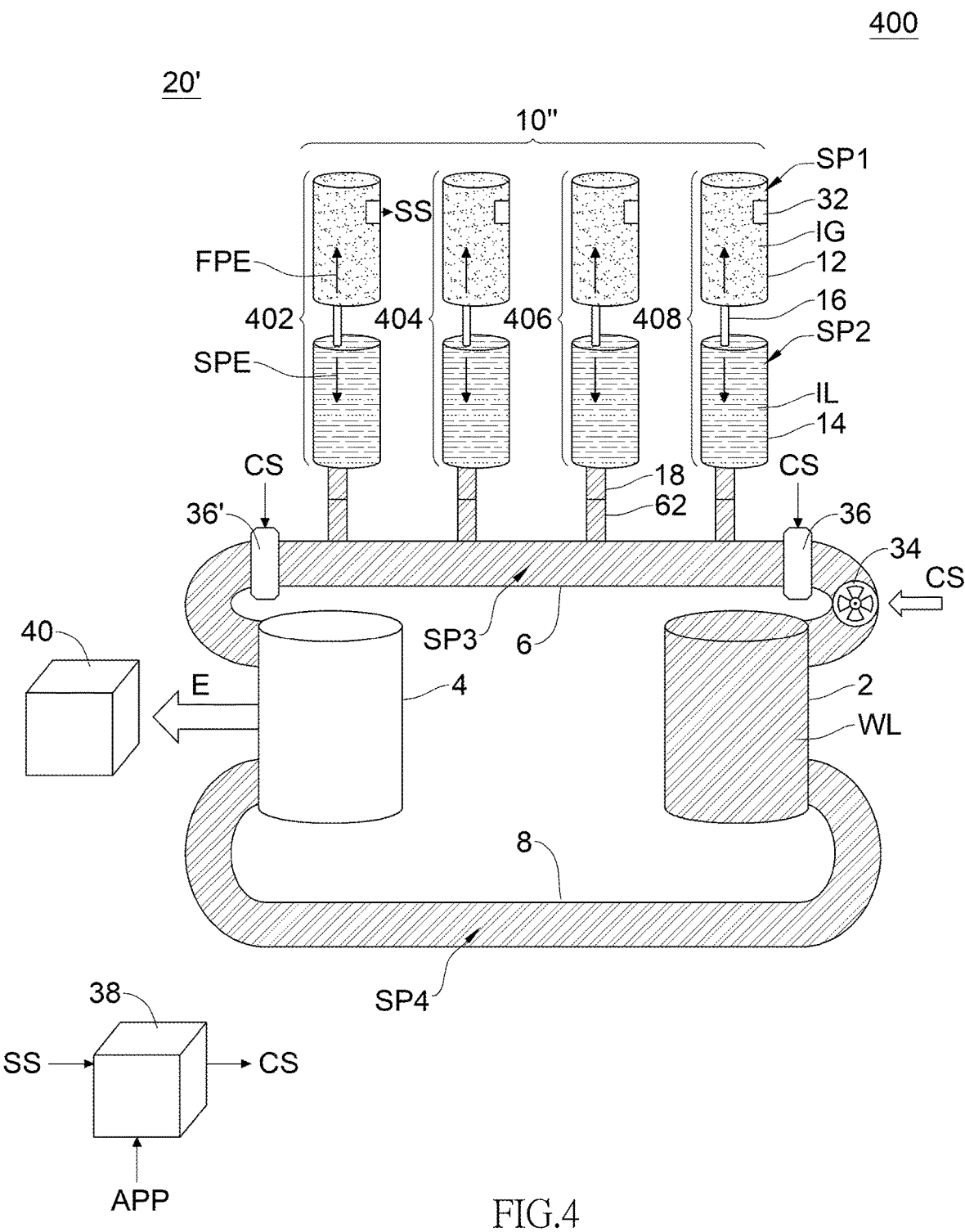
FIG. 4 is a three-dimensional schematic diagram illustrating the energy storage system in accordance with some embodiments.

FIG. 4 is a three-dimensional schematic diagram 400 illustrating the energy storage system in accordance with some embodiments. In FIG. 4, the energy storage system 20' includes not only the energy storage 10", the liquid source 2, the converter 4, the first pipe 6 and the second pipe 8, but also a pressure sensor 32, a pump 34, a valve body 36, and a controller 38. The pump 34 enables the heterogeneous pressure media and interactive actuation energy storage system to have a better energy storage effect, storing and releasing more energy.

The description of the energy storage 10", the liquid source 2, the converter 4, the first pipe 6 and the second pipe 8 are the same as the description of the earlier embodiment and will not be repeated here.

The pressure sensor 32 can be used to sense, for example, changes in the working fluid WL, the initial liquid IL or the initial gas IG and generate a corresponding sensing signal SS. Here, the pressure sensor 32 is disposed of at the first container 12 as an example. In other embodiments, the pressure sensor 32 may also be disposed of at least one of the second container 14, the first tube 16, the second tube 18, the first pipe 6 and the second pipe 8.

The pump 34 can be used to adjust, for example, the flow rate of the working liquid WL or the initial liquid IL. The pump 34 herein can be specially designed to provide the working liquid WL to generate a higher flow rate and pressure to act on the initial liquid IL and the initial gas IG, and energy can be quickly and readily stored in the first container 12 and the second container 14. Herein, the pump 34 is disposed between the first pipe 6 and the liquid source 2 as an example. In other embodiments, the pump 34 may also be disposed of at least one of the first space SP1, the second space SP2, the first tube 16, the second tube 18, between the first tube 16 and the first container 12, between the second tube 18 and the second container 14, the first pipe 6, the second pipe 8, between the second pipe 8 and the liquid source 2, and between the second pipe 8 and the converter 2. In addition, the pump 34 regulates the working liquid WL of the liquid source 2 to enter the energy storage 10".

The valve bodies 36, 36' can provide an open mode and a closed mode manually and automatically. The automatic control can be done via the control signal CS. The control signal CS can be generated from the controller 38. Moreover, in the open mode, the working fluid WL, the initial liquid IL and the initial gas IG can pass through the valve bodies. In the closed mode, the working fluid WL, the initial liquid IL and the initial gas IG are stopped by the valve bodies. Herein, taking the valve body 36 between the first pipe 6 and the liquid source 2 and the valve body 36' between the first pipe 6 and the converter 4 as an example for description, in other embodiments, the valve body may also be disposed at the at least one of the first container 12, the second container 14, the first tube 16, the second tube 18, between the first tube 16 and the first container 12, between the second tube 18 and the second container 14, the first pipe 6, the second pipe 8, between the second pipe 8 and the liquid source 2, and between the second pipe 8 and the converter 4.

The controller 38 may receive a sensing signal SS generated by the pressure sensor 32 from sensing the pressure generated by, for example, the working fluid WL, the initial liquid IL or the initial gas IG. The controller 38 generates a control signal CS according to the sensing signal SS to operate the valve bodies 36, 36' to further execute the open mode or the closed mode. In detail, the controller 38 outputs the control signal CS to operate the valve body 36 to control the initial gas IG at a predetermined pressure, and when the initial gas IG has a predetermined pressure, the initial gas IG stops to be compressed.

In another embodiment, the controller 38 can control the control program APP (e.g., similar to control system 102 of FIG. 1) to allow the energy storages 402, 404, 406 and 408 to store the first pressure energy FPE or convert the second pressure in a synchronous manner. For example, the controller 38 controls the valve body 36 so that the four energy storages 402, 404, 406 and 408 can simultaneously store about four times the first pressure energy FPE, or the four energy storages 402, 404, 406 and 408 can simultaneously release about four times the second pressure energy SPE. In some embodiments, the controller commands that the four energy storages 402, 404, 406 and 408 simultaneously store the first pressure energy (FPE) during off-peak periods. In some embodiments, the controller commands that the four energy storages 402, 404, 406 and 408 simultaneously release the second pressure energy (SPE) during peak periods.

In yet another embodiment, the controller 38 can also control a control program APP to allow the energy storages 402, 404, 406 and 408 to store the first pressure energy FPE or convert the second pressure energy SPE asynchronously.

For example, the controller 38 controls the valve body 36 or individually controllable valves at connection ports 62 (not shown) so that any of the energy storages 402, 404, 406 and 408 can independently store or release energy. In other words, the controller 38 can select one, more or all of the energy storages to drive the converter to generate one or several times the electrical energy or extend the duration for the electrical energy E to generate electricity.

In some embodiments, the first pressure energy FPE stored in the energy storages 402, 404, 406 and 408 is different from each other to maximize the total energy storage efficiency of the energy storage system. For example, compared to the energy storages 404, 406 and 408, the energy storage 402 can store the minimum first pressure energy. If the first pressure energy stored in the energy storage 402 is sufficient to cover the difference between the energy required by the market and the energy currently available, the energy storage system may not need to release the FPE stored in the energy storages 404, 406 and 408. In this way, over-operation of the energy storage system can be avoided.

In another embodiment, the controller 38 monitor the amount of electrical energy E generated. For example, when an abnormality (such as insufficiency or overload) occurs in the electric power, the controller 38 issues an abnormal notification.

In another embodiment, the controller 38 is capable of configuring electrical energy E, so as to supply electrical energy required in the energy storage 10 to achieve the purpose of self-generation and self-supply.

In another embodiment, the energy storage 10 further includes an extended energy storage unit 40 connected to the converter 4 to store electrical energy E. The extended energy storage unit 40 may be, for example, a storage battery, a secondary battery, a supercapacitor, or the like.

Figure 5:
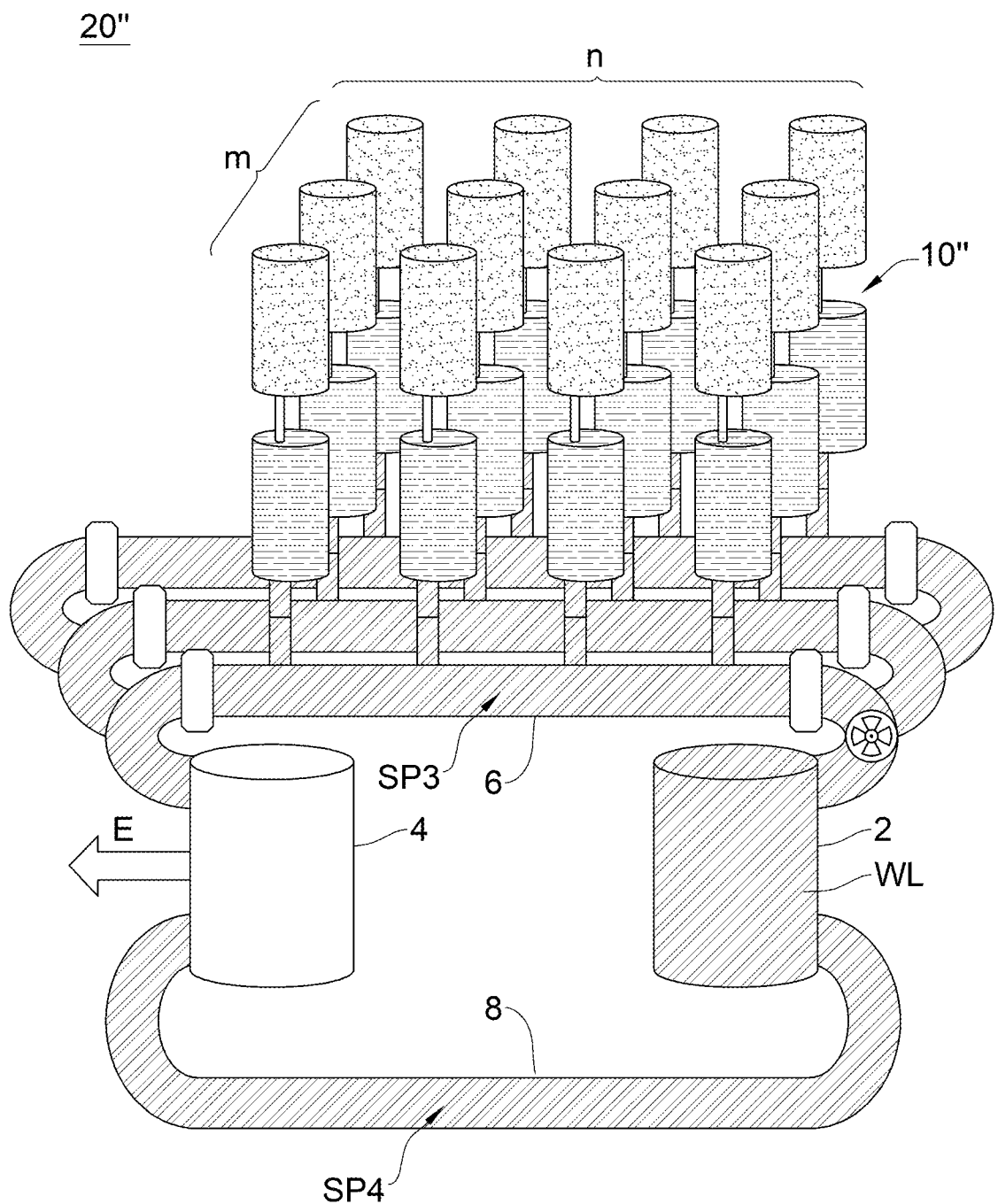
FIG. 5 illustrates the energy storage system having n×m units of energy storages 10".

FIG. 5 illustrates the energy storage system 500 having n×m units of energy storages 10". In this embodiment, the energy storage system 500 has 4×3 units of energy storages 10". The number of energy storages 10" can be adjusted according to the needs of the user. In some embodiments, the energy storage system 500 has 200×300 units of energy storages 10".

Figure 6:
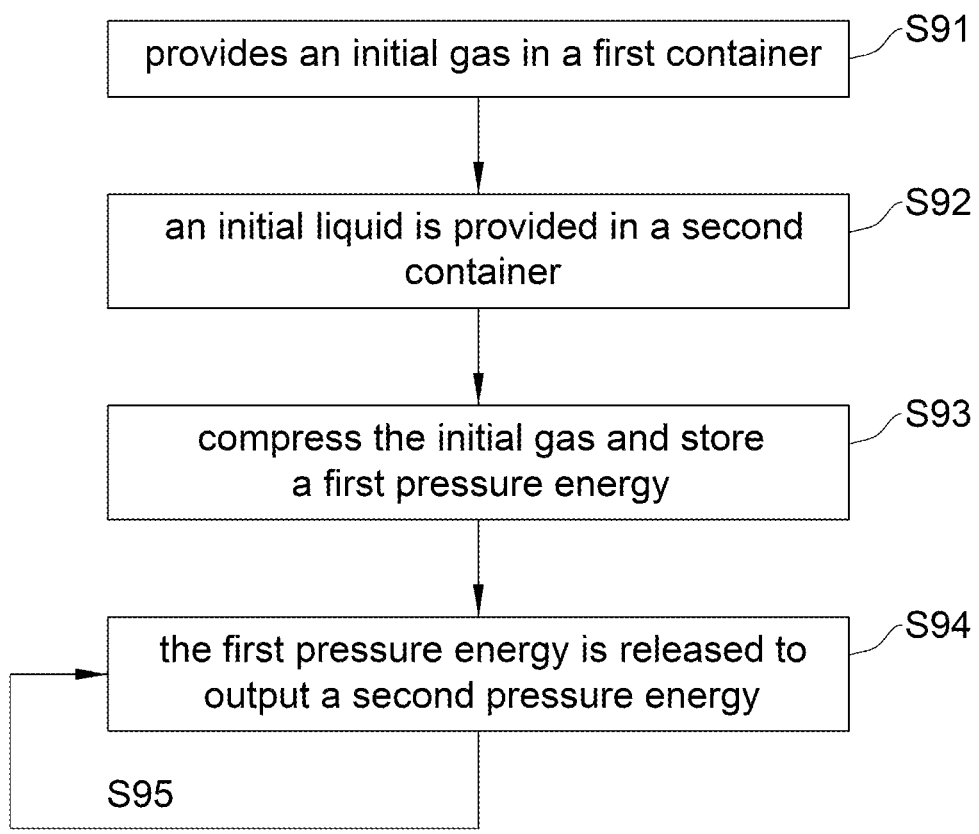
FIG. 6 is a schematic flow chart showing the energy storage method using heterogeneous pressure media and interactive actuation in accordance with some embodiments.

FIG. 6 is a schematic flow chart 600 shows the energy storage method using heterogeneous pressure media and interactive actuation in accordance with some embodiments. In FIG. 6, the method starts at Step S91, which provides an initial gas in a first container. The initial gas can be air or inert gas (e.g., helium, nitrogen).

At Step S92, an initial liquid (e.g., water) is provided in a second container.

At Step S93, a working liquid is supplied to the second container to drive the initial liquid to compress the initial gas and store a first pressure energy. In some embodiments, the working liquid is the same as the initial liquid (e.g. water). The predetermined ranges of pressure, speed, among others of compression and release are monitors and controlled by appropriate sensors and controllers (e.g., computer-controlled valves).

At Step S94, the first pressure energy is released by expanding the compressed gas to drive the initial liquid to work on the working fluid to output a second pressure energy.

At Step S95, Steps S93 to S94 are performed to repeatedly act between the first pressure energy and the second pressure energy to output energy; for example, using the second pressure energy to drive a converter (such as a liquid pump, a turbo pump, liquid generator, liquid turbine generator, hydro turbine generator) to generate electricity.

In another embodiment, after Step S95, the working fluid is recovered to be applied to the second container again to form a closed system in which the working fluid can be repeatedly used.

In utilization, the devices and systems are used to store and release energy so that such stored energy can be used on-demand.

In operation, a system converts an electrical energy into a potential energy or compressed air energy, storing the converted energy, and releasing the stored energy when in-demand.

The power storage system can be used as a backup power system or standby power system, which can be built in supporting a power plant or a sub-power plant (e.g., at the power distribution level before the end user). For example, the power storage system can be used when the supply of the green energy/electrical power is disrupted or unstable.

Figure 7:
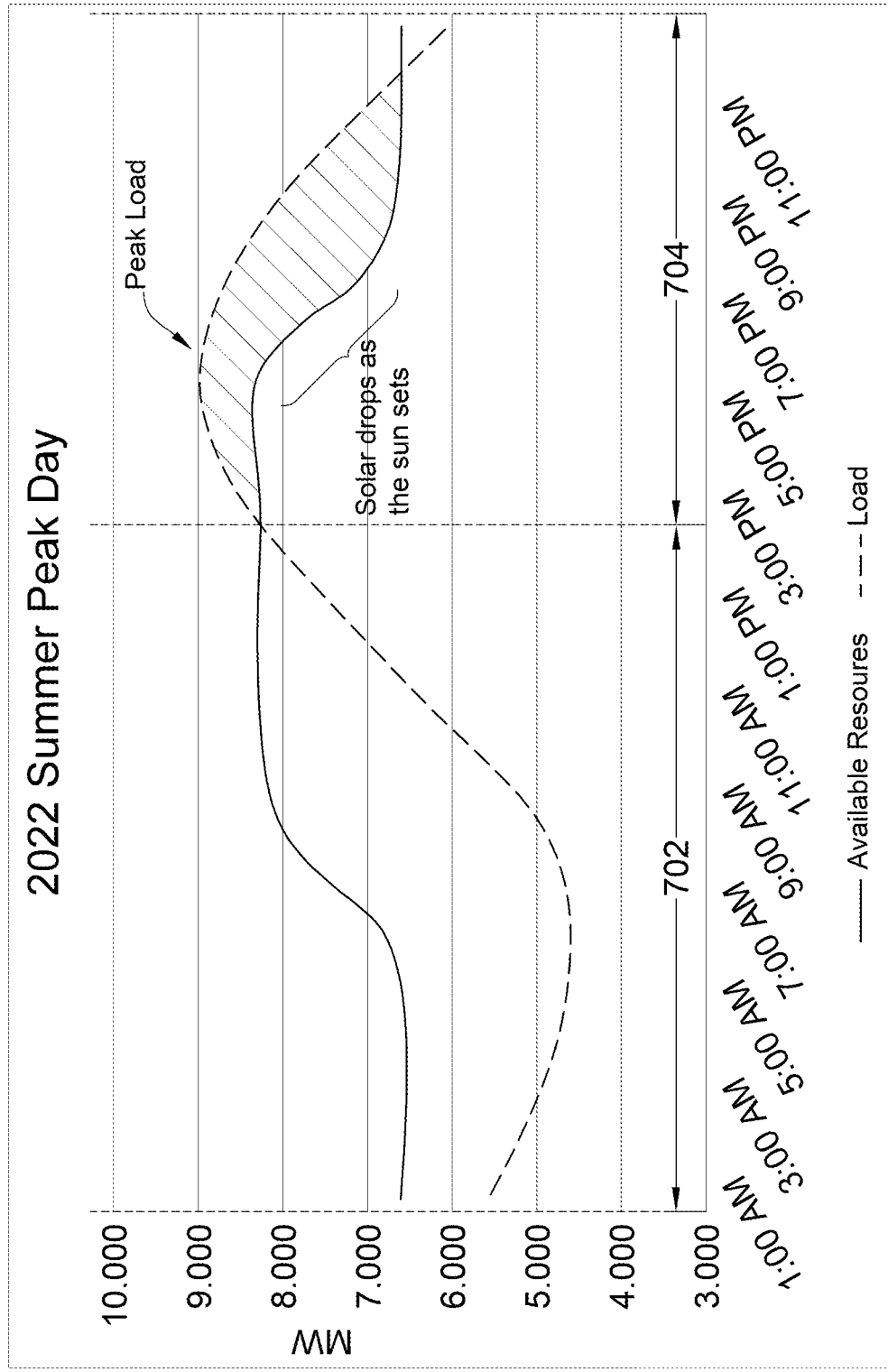
FIG. 7 shows an electricity demand curve on a summer peak day.

FIG. 7 shows an electricity demand curve on a summer peak day. In FIG. 7, zone 702 is in the period of excess power supply and zone 704 is in the period of power supply deficit. For more efficient use of electricity, the energy storage system of this disclosure can be in an energy storage mode during the period of excess power supply and in electricity generating mode during the period of electricity shortage.

The energy storage efficiency of the energy storage system can be optimized based on an efficiency factor, such as total economic efficiency. In FIG. 7, the electricity price for zone 702 is an off-peak electricity price and the electricity price for zone 704 is a peak electricity price. As mentioned above, in FIG. 4, the pump 34 can be used to adjust the flow rate of the working liquid WL or the initial liquid IL.

During the off-peak periods (zone 702) shown in FIG. 7, the pump 34 can be arranged to provide the working liquid WL to generate a higher flow rate and pressure to act on the initial liquid IL and the initial gas IG, and energy can be quickly and easily stored in the first container 12 and the second container 14.

During the peak periods (zone 704) shown in FIG. 7, the energy stored in a form of the amount of water, which can be pushed to drive a hydrogenerator by the compressed gas so that electricity is generated/regenerated on-demand.

FIG. 7 illustrates that the energy can be stored and re-generated based on a extra supply-and-on demand relationship. The energy storage system disclosed herein can operate based on any other determining factors, such as the market price of the energy during the time in a day/season/in-real time, electricity demands in a city, regional supply or demand, and among any other factors.

Figure 8:
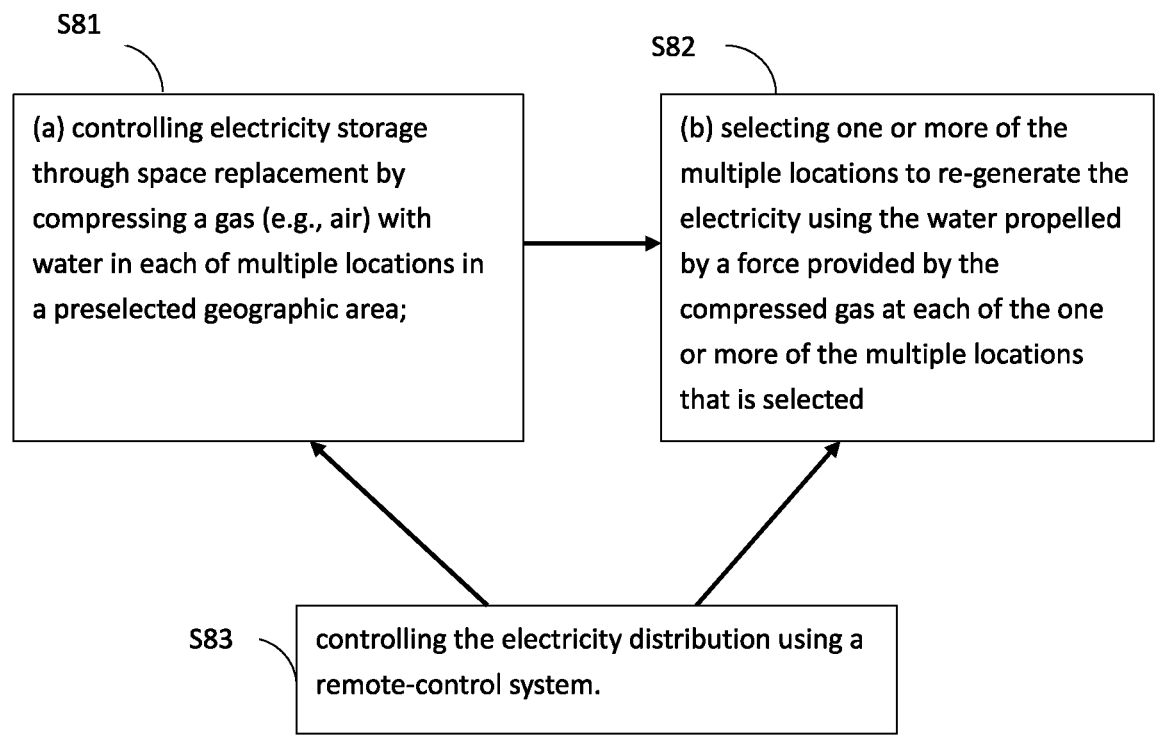
FIG. 8 is a schematic flow chart illustrating the method of distributing electricity from an energy bank in accordance with some embodiments.

FIG. 8 is a schematic flow chart illustrating the method of distributing electricity from an energy bank in accordance with some embodiments. In FIG. 8, the method starts at Step S81. At Step S81, the electricity storage is controlled through space replacement by compressing a gas (e.g., air) with water in each of multiple locations in a preselected geographic area.

At Step 82, one or more of the multiple locations is selected to re-generate the electricity using the water propelled by a force provided by the compressed gas at each of the one or more of the multiple selected locations.

At Step 83, the electricity distribution is controlled by a remote-control system. For example, the electricity distribution can be controlled by a mobile device such as a smart phone. The switch between electricity storage and regeneration can be determined by the electricity price, such as the market electricity purchasing price, the market electricity selling price. The switch between electricity storage and regeneration can also be determined by electricity demand.

In utilization, the energy storage systems are used for energy storage.

In operation, energy is stored in a form of water with compressed gas and energy can be released or re-generated in a form of electricity when needed, which is controlled by the operating systems disclosed herein.

The present invention has been disclosed in preferred embodiments above, but those skilled in the art should understand that this embodiment is only used to describe the present invention and should not be construed as limiting the scope of the present invention. It should be noted that all changes and substitutions equivalent to this embodiment should be included in the scope of the present invention. Therefore, the protection scope of the present invention shall be defined by the scope of the patent application.

What is claimed is:

1. An energy storage system comprising:
    a first fluid container for accommodating a liquid and a gas;
    a pump configured to pump the liquid into the first fluid container to compress the gas in the first fluid container;
    a hydrogenerator driven by the liquid coming out from the first fluid container to generate electricity; and
    an electronic controlling system configured to:
        selectively control the pumping of the liquid to compress the gas to a predetermined pressure range when in an energy storage mode;
        dynamically adjust the predetermined pressure range based on sensed conditions; and
        selectively control a flow rate, a flow volume, or both of the first fluid to generate electricity when in an electricity generating mode by driving a hydrogenerator, so that an energy storage efficiency of the energy storage system is optimized.

2. The energy storage system of claim 1, further comprising a second fluid container fluidly coupled with the first fluid container, wherein the second fluid container is configured to contain the gas only.

3. The energy storage system of claim 1, wherein the energy storage efficiency of the energy storage system is optimized based on an efficiency factor.

4. The energy storage system of claim 3, wherein the efficiency factor comprises a total energy store-and-regenerate efficiency based on controlling the flow rate, the flow volume, or both of the fluid driving the hydrogenerator when in the electricity generating mode.

5. The energy storage system of claim 3, wherein the efficiency factor comprises a total economic efficiency based on selecting a time in a day to initiate the energy storage mode or the electricity generating mode.

6. The energy storage system of claim 5, wherein the total economic efficiency comprises a market electricity purchasing price.

7. The energy storage system of claim 5, wherein the total economic efficiency comprises a market electricity selling price.

8. The energy storage system of claim 1, further comprising selecting a time in a day to be in the energy storage mode or the electricity generating mode based on peak hours of a local market.

9. The energy storage system of claim 1, further comprising selecting a time in a day to be in the energy storage mode or the electricity generating mode based on a real-time electricity demand of a local market.

10. The energy storage system of claim 1, further comprising an Uninterruptible Power Supply (UPS) containing a battery or a supercapacitor coupled with the energy storage system.

11. An energy storage system controlling method comprising:
    pumping a liquid to compress a gas in a first fluid container to a predetermined pressure range when in an energy storage mode by using an electronic controlling system;
    dynamically adjusting the predetermined pressure range with the electronic controlling system based on sensed conditions; and
    controlling a flow of a first fluid to generate electricity by driving a hydrogenerator with the liquid when in a electricity generating mode by using the electronic controlling system.

12. The method of claim 11, further comprising selecting a time in a day to initiate the energy storage mode or the electricity generating mode.

13. The method of claim 11, further comprising selecting a time in a day to initiate the energy storage mode based on a market electricity purchasing price.

14. The method of claim 11, further comprising selecting an off-peak hour to initiate the energy storage.

15. The method of claim 11, further comprising selecting a time in a day to initiate the electricity generating mode based on a market electricity selling price.

16. The method of claim 11, further comprising selecting a peak hour to initiate the electricity generating mode.

17. The method of claim 11, further comprising controlling the electronic controlling system using a remote device.

18. The method of claim 17, wherein the remote device comprises a mobile device.

19. A method of distributing electricity from an energy bank comprising:
    controlling electricity storage through space replacement by compressing a gas with water to a predetermined pressure range in each of multiple locations in a pre-selected geographic area;
    dynamically adjusting the predetermined pressure range at each location of the multiple locations based on sensed conditions at the location; and
    selecting one or more of the multiple locations to re-generate the electricity using the water propelled by a force provided by the compressed gas at each of the one or more of the multiple locations that is selected.

20. The method of claim 19, further comprising selecting an off-peak hour for electricity storage.

21. The method of claim 19, further comprising selecting a peak hour for re-generating the electricity.

22. The method of claim 19, further comprising re-generating the electricity based on an electricity demand of a selected region among the one or more of the multiple locations.

23. The method of claim 19, further comprising controlling the electricity distribution at a remote-control center.

24. The method of claim 19, further comprising controlling the electricity distribution using a remote-control system.

25. The method of claim 19, further comprising controlling the electricity distribution using a mobile device.

* * * * *